G. W. HOAR.
DRAWN METAL SHELL WITH REINFORCED END AND METHOD OF MAKING THE SAME.
APPLICATION FILED APR. 10, 1918.
1,323,532.
Patented Dec. 2, 1919.
3 SHEETS—SHEET 2.
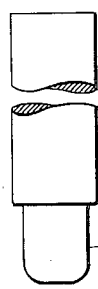
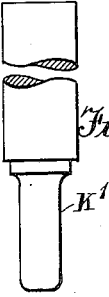
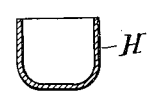
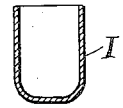
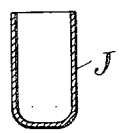
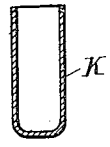
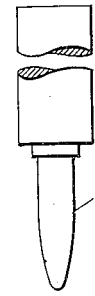
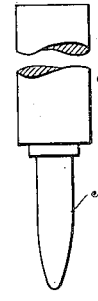
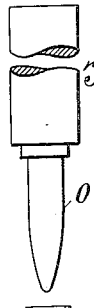
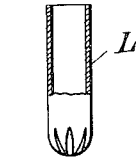
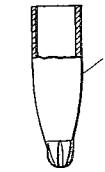
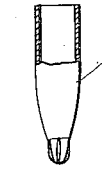
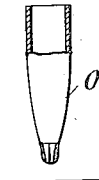
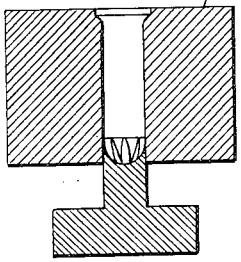
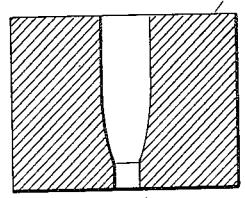
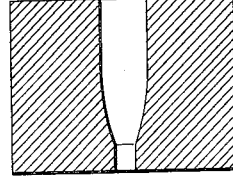
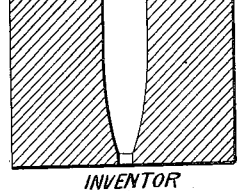
INVENTOR
*Geo. W. Hoar*
BY
*C. W. Fairbank*
ATTORNEY

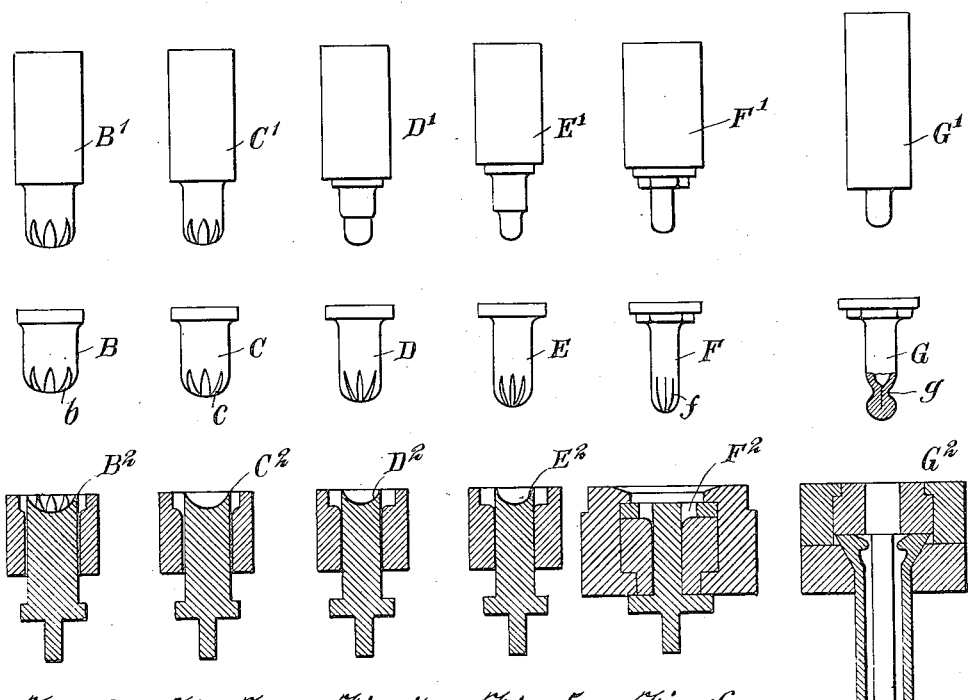

UNITED STATES PATENT OFFICE.

GEORGE WESTON HOAR, OF WALTHAM, MASSACHUSETTS.

DRAWN-METAL SHELL WITH REINFORCED END AND METHOD OF MAKING THE SAME.

1,323,532.  Specification of Letters Patent.  Patented Dec. 2, 1919.

Application filed April 10, 1918. Serial No. 227,677.

*To all whom it may concern:*

Be it known that I, GEORGE W. HOAR, a citizen of the United States, and resident of Waltham, in the county of Middlesex and State of Massachusetts, have invented certain new and useful Improvements in Drawn-Metal Shells with Reinforced Ends and Methods of Making the Same, of which the following is a specification.

The object of the present invention is to reinforce or strengthen a tube or shell particularly at the end thereof by forming a substantially solid mass of metal integral with the wall of the shell or tube.

My invention is applicable to various different articles made of ductile metal or alloy such as copper, or brass or of other suitable material which may be readily drawn and bent, and the reinforced or thickened part may serve various different functions according to the construction, purpose and operation of the article to which the invention is applied.

The method may be carried out during the formation of the article from a flat blank, a tube or other stock form by the appropriate formation of the punching, drawing or other forming dies so that no separate operations on the article are required.

In order to secure the desired reinforcement, thickening, or solid mass of metal, I first crimp or corrugate the shell or tube, the corrugations, folds or plicatures preferably, although not necessarily, extending lengthwise of the tube or shell. The sides of these corrugations, folds or plicatures are brought together by successive operations and the metal compressed to form preferably substantially smooth interior and exterior surfaces.

Merely as a few examples of articles to which my invention is particularly applicable, I may mention studs, such as are commonly employed as a part of the snap fasteners for automobile side curtains, the tips or ferrules of umbrellas, canes or the like and armor piercing bullets. It will of course be understood that I do not wish to be limited to these particular articles.

In the accompanying drawings, I have illustrated certain articles in the successive steps of their manufacture and dies adapted for performing these successive steps. In these drawings, Figures 1 to 7 inclusive show a curtain fastener stud in the successive steps of manufacture in carrying out my process and the coacting dies for performing these successive steps.

Figs. 8 to 12 inclusive are transverse sections on a very much enlarged scale through the extreme lower portion of the stud in the forms shown in Figs. 2 to 6 respectively.

Figs. 13 to 21 show the successive steps in the formation of an article very much more pointed than the stud shown in Figs. 1 to 7 inclusive and may be particularly adapted for use as a shell for an armor piercing bullet or projectile.

Figs. 22 and 23 show the successive steps which may be employed in converting the shell shown in Fig. 21 into a completed article.

Figures 21, 22, 23:
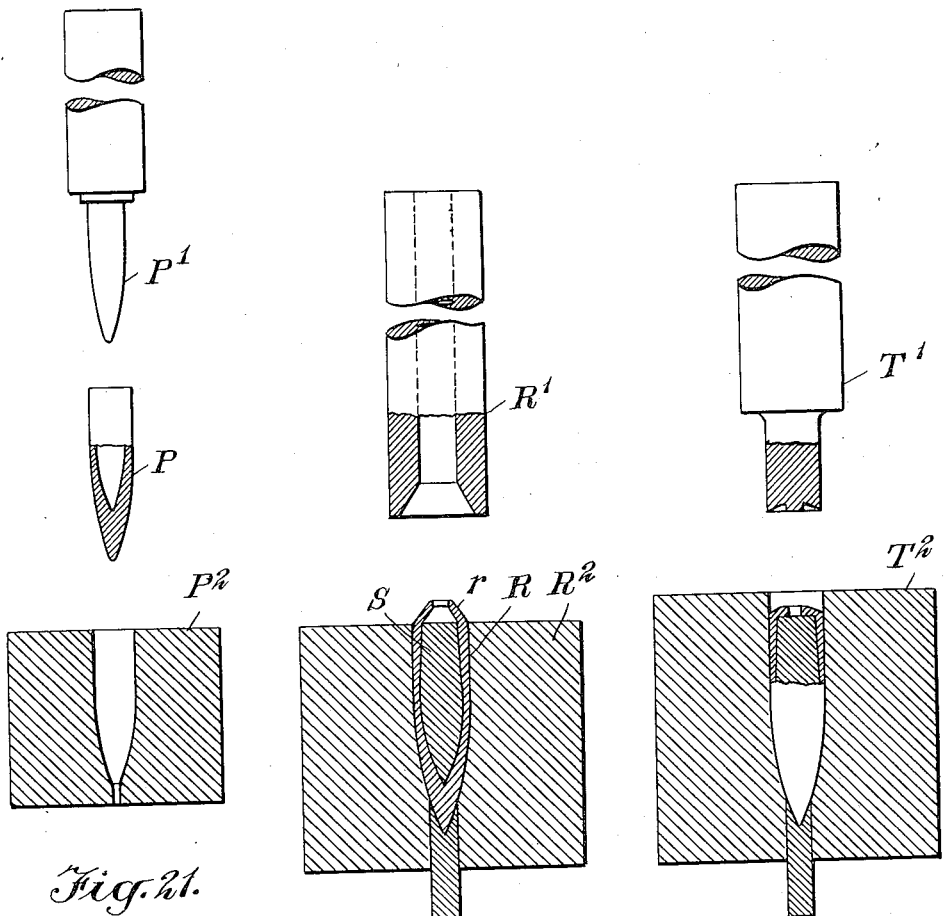

My improved article is preferably made by the use of suitable dies for performing the drawing, corrugating and compressing operations although I do not wish to be limited to any particular mechanism. In making a stud for use as a part of an automobile curtain fastener, for instance of the type shown in my prior Patent No. 1,178,921, issued April 11, 1916, I may start with a flat blank A, as shown in Fig. 1 and may draw this to the form of a cup or cup-like shell by the action of coacting die members $A^1$ and $A^2$. The cup resulting from this pressing or drawing operation may be placed between coacting die members $B^1$ and $B^2$ to produce the shell B. The die members $B^1$ and $B^2$ may have radially coacting corrugations so as to produce corrugations —b— which, on very much enlarged scale, may appear as shown in Fig. 8.

The shell may then be brought between coacting die members $C^1$ and $C^2$ to produce the shell C. In this form, the body of the shell has been somewhat elongated and reduced in diameter and the side walls of the corrugations C, have been brought together somewhat as shown in Fig. 9. The corrugated portion is not materially increased in length during this or the succeeding operations, it being only the part of the shell between the open end and the corrugations which is elongated.

In the next successive operation, the body of the shell is further reduced and elongated and the sides of the corrugations are still further brought together as shown at —d— in the shell D of Figs. 4 and 10. This may be done by suitable dies $D^1$ and $D^2$. A further compressing and drawing operation by such die members as $E^1$ and $E^2$ may produce the shell E with the corrugations —e— practically closed together to form a solid head.

A further pressing by such die members as $F^1$ and $F^2$ may produce the shell F with its solid head and corrugations —f— entirely closed up so as to produce a solid mass of metal for reinforcement or other desired purpose.

By making the solid head in this manner, the shell is composed of a single piece with the desired strength and rigidity and the separate operation of filling the head with a separate slug or by pouring in molten metal is avoided.

If the device is to be used as a part of a curtain fastener and an annular groove or neck is desired adjacent to the free end of the stud, this may be produced by such die members as $G^1$ and $G^2$, which will form the complete article G with the annular groove —g— and this operation will still further consolidate and harden the solid reinforced head portion. The stud G is shown with an enlarged base adapting it to be readily secured to the desired supporting surface, this base being produced and formed during the successive operations in the die members $B^1$ and $B^2$ to $F^1$ and $F^2$ inclusive. If the article is to be used for some other purpose and where no such enlarged base is desired, as, for instance, on the tip of an umbrella rod or a cane, it will of course be evident that the dies would be so formed that the body of the shell could be of uniform diameter throughout, with the exception of the rounded head or reinforced end.

In Figs. 13 to 21 inclusive, I have shown the successive steps in the production of a somewhat differently shaped article but in which the same method is employed for the same general purpose. The die members $H^1$ and $H^2$ may produce a shell —H— from a flat blank and by successive operations, this blank may be changed to the forms L, J and K by die members $I^1$ and $I^2$, $J^1$ and $J^2$, and $K^1$ and $K^2$ respectively. These operations form no portion of my present invention but merely represent the successive steps which may be employed in the manufacture of a tubular closed end shell K. This might have been produced by the closing of the end of a piece of metal tubing by any well known process.

The shell K, upon being operated on by the die members $L^1$ and $L^2$, may be brought to the form L, shown in Fig. 17, in which radial corrugations or grooves are pressed into the terminal portion of the shell. By suitably forming the successive die members, this shell may be compressed at the closed end as in M, N, O and P by die members $M^1$ and $M^2$, $N^1$ and $N^2$, $O^1$ and $O^2$ and $P^1$ and $P^2$, to produce a sharp pointed shell with the body portion of substantially uniform thickness and with the closed end of very materially increased thickness as shown particularly in section in Fig. 21. This form may be employed as an umbrella rod tip or as a tip on any other rod or device where a pointed reinforced or solid portion is desired.

Such a shell is particularly adapted for use as the exterior shell of an armor piercing bullet if made of the proper size, shape and ductile material. A drawn metal shell R constructed as in Figs. 13 to 21 inclusive, but made slightly longer, may have a steel slug or core S placed therein and the rear open end —r— of the shell may be bent over as shown in Fig. 22 by suitable die members $R^1$ and $R^2$ and may be forced to final position by die members $T^1$ and $T^2$. If the slug be slightly tapered toward the rear as shown in Figs. 22 and 23, this final operation will tend to flow or force the metal endwise to a slight extent and completely and solidly inclose the slug, leaving the exterior of the shell cylindrical. Such a device as shown in Fig. 23 may be employed as an armor piercing bullet or projectile.

It will of course be evident that the corrugating of the shell, the closing together of the corrugations and the compressing of the metal to solid form may be done in a materially smaller or greater number of operations than as illustrated, depending upon the thickness of the wall of the shell, the character of the metal employed and the size and proportions of the thickened or reinforced part. It will also be evident that any portion of a tubular shell intermediate of its ends may be reduced in diameter and the wall correspondingly thickened by the same method, or that a shell may be entirely closed at some point intermediate of its ends by a solid portion instead of having this portion at one extreme end as illustrated.

Having thus described my invention, what I claim as new and desire to secure by Letters Patent is:

1. The method of forming a tubular metal shell with a closed reinforced end which consists in providing a closed end sheet metal shell, longitudinally fluting or corrugating the wall of the shell adjacent to the closed end, and reducing the diameter of the shell by increasing the length of the body of the shell and forcing together the sides of the corrugations or flutes at the closed end of the shell.

2. The herein described method consisting in forming a drawn metal tube with a closed end, longitudinally fluting or corrugating the peripheral wall of the tube adjacent to the closed end and contracting the fluted or corrugated portion by cold pressure to form a solid point or head.

3. The herein described method, consisting in cupping a blank to form a closed end tube, forcing inwardly spaced portions at and adjacent to said closed end and compressing said portion to reduce the external diameter and present smooth interior and exterior surfaces of materially greater thickness than the wall of said tube.

4. The herein described method which consists in cupping a blank to form a closed end tube, forcing inwardly spaced portions of said tube at and adjacent to said closed end, bringing the edges of said inwardly forced portions together and compressing the metal to form a reinforced or thickened portion.

5. The method of forming a drawn, tubular, metal shell with a closed reinforced end which consists in corrugating or fluting the wall of the shell adjacent to the closed end and thereafter reducing the diameter of the shell at this point by forcing together the sides of the corrugations to produce a solid reinforced head or end portion.

6. A drawn metal shell having a reinforced, closed end, presenting substantially smooth exterior and interior surfaces, and the reinforced closed end including corrugated portions of the shell pressed together.

7. A tubular metal shell with a closed, pointed, reinforced end, said end portion presenting substantially smooth exterior and interior surfaces and including an annular series of corrugated laminations.

Signed at Waltham, in the county of Middlesex and State of Massachusetts, this 3d day of April, A. D. 1918.

GEORGE WESTON HOAR.